(12) United States Patent
Koyanagi

(10) Patent No.: US 11,546,152 B2
(45) Date of Patent: Jan. 3, 2023

(54) DISPLAY DEVICE, CONTROL METHOD AND PROGRAM

(71) Applicant: NEC Display Solutions, Ltd., Tokyo (JP)

(72) Inventor: Kazuyuki Koyanagi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 133 days.

(21) Appl. No.: 16/964,457

(22) PCT Filed: Mar. 15, 2018

(86) PCT No.: PCT/JP2018/010271
§ 371 (c)(1),
(2) Date: Jul. 23, 2020

(87) PCT Pub. No.: WO2019/176060
PCT Pub. Date: Sep. 19, 2019

(65) Prior Publication Data
US 2021/0051009 A1     Feb. 18, 2021

(51) Int. Cl.
*H04L 9/08* (2006.01)
*H04L 9/14* (2006.01)

(52) U.S. Cl.
CPC .............. *H04L 9/0891* (2013.01); *H04L 9/14* (2013.01)

(58) Field of Classification Search
CPC ................................ H04L 9/0891; H04L 9/14
See application file for complete search history.

(56) References Cited

U.S. PATENT DOCUMENTS

| 11,012,661 B2 * | 5/2021 | Momose ................ H04N 7/01 |
| 2009/0147028 A1 * | 6/2009 | Sefton ................ G06F 3/1446 |
| | | 345/82 |

(Continued)

FOREIGN PATENT DOCUMENTS

| CN | 1551627 A | 12/2004 |
| CN | 1873685 A | 12/2006 |

(Continued)

OTHER PUBLICATIONS

International Search Report (ISR) (PCT Form PCT/ISA/210), in PCT/JP2018/010271, dated Jun. 5, 2018.

(Continued)

*Primary Examiner* — Yonas A Bayou
(74) *Attorney, Agent, or Firm* — McGinn I.P. Law Group, PLLC.

(57) ABSTRACT

A display device connected to a signal source outputting a video signal using an encryption protocol and that transmits the encryption key to the signal source includes: a transmission unit that transmits an own encryption key uniquely set for the display device and an encryption key transmitted from another display device connected to the display device as a lower device to the signal source and another display device connected as an upper device; and a stop instruction unit that instructs another display device corresponding to a predetermined encryption key included in an encryption key group based on the order of the own encryption keys included in the encryption key group to stop transmitting the encryption key received when the own encryption key is included in the encryption key group including a plurality of encryption keys transmitted from another display device connected as the lower device.

7 Claims, 10 Drawing Sheets

(56) References Cited

U.S. PATENT DOCUMENTS

| | | | | |
|---|---|---|---|---|
| 2012/0257750 A1* | 10/2012 | Bohm | ............... | H04N 21/41422 |
| | | | | 380/212 |
| 2013/0181884 A1* | 7/2013 | Perkins | ................. | G09F 9/3026 |
| | | | | 345/1.3 |
| 2015/0109310 A1 | 4/2015 | Ayanam et al. | | |
| 2016/0094648 A1* | 3/2016 | Han | ....................... | H04W 76/10 |
| | | | | 709/209 |
| 2018/0090098 A1* | 3/2018 | Sakagami | ................. | G06T 5/50 |

FOREIGN PATENT DOCUMENTS

| | | | |
|---|---|---|---|
| CN | 1020843334 | A | 6/2011 |
| CN | 104301645 | A | 1/2015 |
| CN | 104995888 | A | 10/2015 |
| CN | 105409133 | A | 3/2016 |
| CN | 106067295 | A | 11/2016 |
| JP | 2007-085009 | A | 4/2007 |
| JP | 4198190 | B1 | 12/2008 |
| JP | 5132807 | B1 | 1/2013 |
| JP | 2013-055505 | A | 3/2013 |
| JP | 2017-156414 | A | 9/2017 |
| WO | WO 2014/064824 | A1 | 5/2014 |
| WO | WO 2015/041139 | A1 | 3/2015 |
| WO | WO 2016/170596 | A1 | 10/2016 |

OTHER PUBLICATIONS

Notification on Grant dated Aug. 3, 2022 for Chinese Application No. 201880089879.8.

* cited by examiner

INSTRUCT TO STOP REPEATER FUNCTION

DISPLAY DEVICE, CONTROL METHOD AND PROGRAM

TECHNICAL FIELD

The present invention relates to a display device, a control method and a program.

BACKGROUND ART

FIG. 1 is a diagram illustrating an example of a video display system using a plurality of general projectors. The video display system shown in FIG. 1 projects the video A output from PC (Personal Computer) 5, which is the signal source of the video, onto screen A1 and screen B2 by projector No. 1 3 and projector No. 2 4, respectively, arranged in rooms A and B, which are different from each other. PC5, projector No. 1 3, and projector No. 2 4 are connected by a cascade connection using HDMI cables 6 (hereinafter referred to as daisy chain connection). Video display systems for displaying such the same image by using display devices such as a plurality of projectors and monitors for information sharing and video presentation at a distance from each other are widely used in, for example, conference rooms, event venues, showrooms and the like. Thus, by displaying a plurality of images through the use of a plurality of projectors, it is possible to share information at a distance from each other.

In recent years, consideration has been given not only to systems that display the same images to each using different projectors, for example, but to multi-display systems that do displays on a large screen using a plurality of projectors by dividing one image (e.g., see Patent Document 1). Even in such a multi-display system, the projector displays images assigned to each projector by daisy-chaining multiple projectors.

FIG. 2 is a diagram illustrating another example of a video display system using typical projectors. The video display system shown in FIG. 2 has a PC5 and a PC7 as a signal source, a system for switching the output video according to the application. In this case, as shown in FIG. 2, the connection between projector No. 1 3 and projector No. 2 4 is a loop connection which uses HDMI cabling 6.

ART DISCUSSED ABOVE

Patent Literature

[Patent Document 1] International Publication No. 2016/170596

SUMMARY OF THE INVENTION

Problems to be Solved by the Invention

When using an encoding protocol that encodes a video signal between a signal source and a projector, the display device (projector) transmits an encoding key to be used for the encoding protocol to a signal source that outputs the video signal. As described above, in the video display system in which a plurality of display devices are loop-connected, each display device has a function, such as a repeater function for transmitting the encryption key, which is transmitted from the display, which is the connected to the next stage (lower level) device, to the display device and the signal source of the previous stage (upper level).

With such repeater functions, because the functions use the specification of the terminal (lowest level) display device in the daisy-chained system, the lowest level display device is not determined in the loop-connected form and a problem occurs in which it is impossible to display the image correctly.

An object of the present invention is to provide a display device, a control method and a program for solving the above-described problems.

Means for Solving the Problem

The display device of the present invention, a display device, that is connected to a signal source for outputting a video signal using an encryption protocol, and that transmits an encryption key used in the encryption protocol to the signal source, comprising:

a transmission unit that transmits own encryption key which is an encryption key uniquely set for the display device and an encryption key transmitted from another display device connected to the display device as a lower level device in the daisy chain connection to another display device connected as an upper level device in the daisy chain connection; and a stop instruction unit that instructs another display device, corresponding to a predetermined encryption key included in an encryption key group based on the order of the own encryption keys included in the encryption key group, to stop transmitting the encryption key received by the another display device when the own encryption key is included in the encryption key group including a plurality of encryption keys transmitted from another display device connected as the lower level device.

Further, the control method of the present invention, a control method, comprising steps of:

transmitting an own encryption key which is an encryption key uniquely set for a display device that is connected to a signal source for outputting a video signal using an encryption protocol and transmits the encryption key used in the encryption protocol to the signal source, and an encryption key transmitted from another display device connected to the display device as a lower level device in the daisy chain connection to another display device connected as an upper level device in the daisy chain connection; and instructing another display device corresponding to a predetermined encryption key included in an encryption key group based on the order of the own encryption keys included in the encryption key group to stop transmitting the encryption key received by the another display device when the own encryption key is included in the encryption key group including a plurality of encryption keys transmitted from another display device connected as the lower level device.

Further, the program of the present invention, a program that makes a display device which is connected to a signal source for outputting a video signal using an encryption protocol, and transmits an encryption key used in the encryption protocol to the signal source, execute:

processing of transmitting an own encryption key which is an encryption key uniquely set for the display device and an encryption key transmitted from another display device connected to the display device as a lower level device in the daisy chain connection to another display device connected as an upper level device in the daisy chain connection; and processing of instructing another display device corresponding to a predetermined encryption key included in an encryption key group based on the order of the own encryption keys included in the encryption key group to stop transmitting the encryption key received by the another display device when the own encryption key is included in the encryption key group including a plurality of encryption keys transmitted from another display device connected as the lower level device.

Effects of the Invention

As described above, in the present invention, it is possible to perform normal video display.

DETAILED DESCRIPTION OF THE EMBODIMENTS

In the present invention, when the displays device such as projectors are daisy chain connected, even when the connection is in a state of being looped, it is possible to determine it (a daisy chain connection state) and to display the image correctly.

Incidentally, in the daisy-chain connection, the device for outputting the video signal determines that the device for inputting the output video signal is the upper level device connected to the upper (front stage), the device for inputting the output video signal determines that the device for outputting the video signal is the lower level device connected to the lower (rear stage). That is, along the flow of the video signal, the side for outputting the video signal is assumed to be an upper-order (upper level device), and the side for inputting the video signal is defined as a lower-order (lower level device). Further, the source device for outputting the video signal becomes an upper level device located on the higher-order with respect to the video display device to which the video signal is input.

Incidentally, the state in which the connection is looped means, for example, that the output of the video signal of the first projector (sink (Sink) device) is connected to the input of the second projector, that the output of the video signal of the second projector is connected to the input of the third projector, that the output of the video signal of the third projector is connected to the input of the first projector, that a state in which the video signal flow (output path) in a plurality of projectors (sink device) is connected in a ring. Note that the number of projectors (sink devices) to be connected shall be two or more.

It will be described with reference to the accompanying drawings embodiments of the present invention.

First Embodiment

Figure 1:
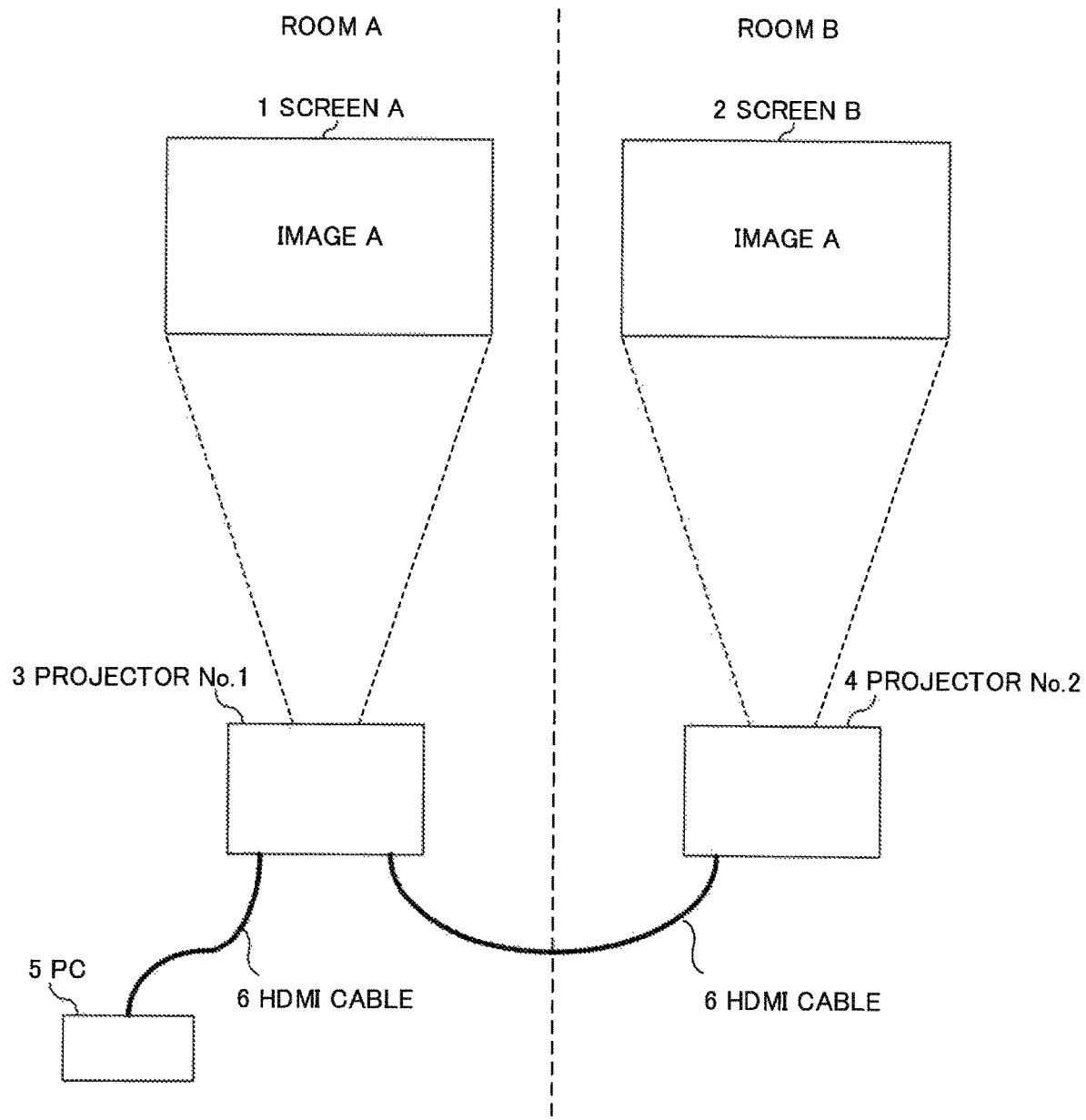
FIG. 1 is a diagram illustrating an example of a video display system using general projectors.
Figure 2:
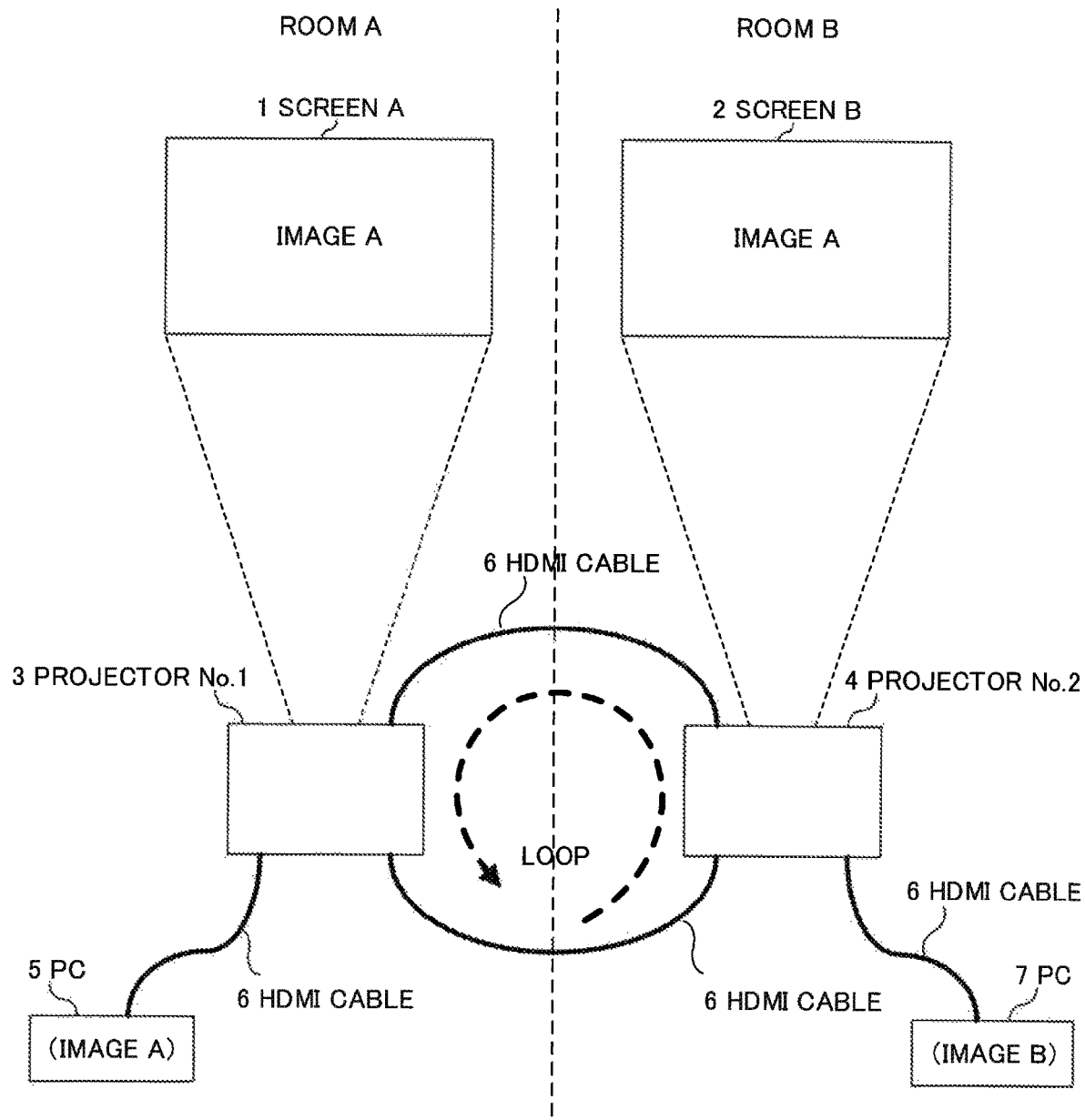
FIG. 2 is a diagram illustrating another example of a video display system using general projectors.
Figure 3:
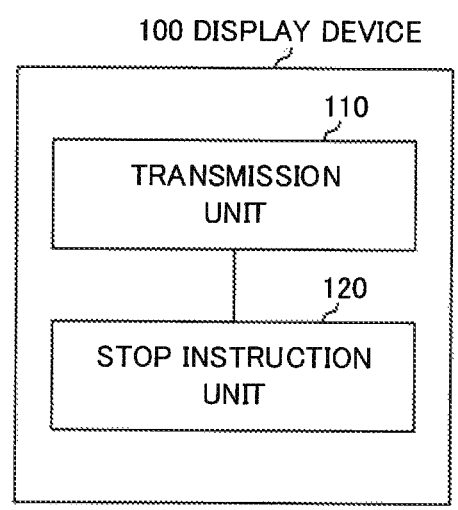
FIG. 3 is a diagram illustrating a first embodiment of a display device of the present invention.

FIG. 3 is a diagram illustrating a first embodiment of the display device of the present invention. Display device 100 in this embodiment, as shown in FIG. 3, has transmission unit 110, and stop instruction unit 120. FIG. 3 shows one example of the main components of the display device in this embodiment, which is related to the present embodiment. Display device 100 illustrated in FIG. 3 is a device that is connected to a signal source that outputs a video signal using an encryption protocol and transmits an encryption key used for the encryption protocol to a signal source.

Transmission unit 110 transmits the own encryption key, which is the encryption key uniquely set for display device 100, and the encryption key, which has been transmitted from another display device connected to display device 100 as a lower level device in the daisy-chain connection, to the signal source and other display devices connected as an upper level device in the daisy-chain connection.

When the own encryption key is included in the encryption key group including a plurality of encryption keys transmitted from another display device connected as a lower level device, the stop instruction unit 120 instructs another display device, corresponding to the predetermined encryption key included in the encryption key group, based on the order of the own encryption keys included in the encryption key group, to stop transmitting the encryption key received by the display device.

Figure 4:
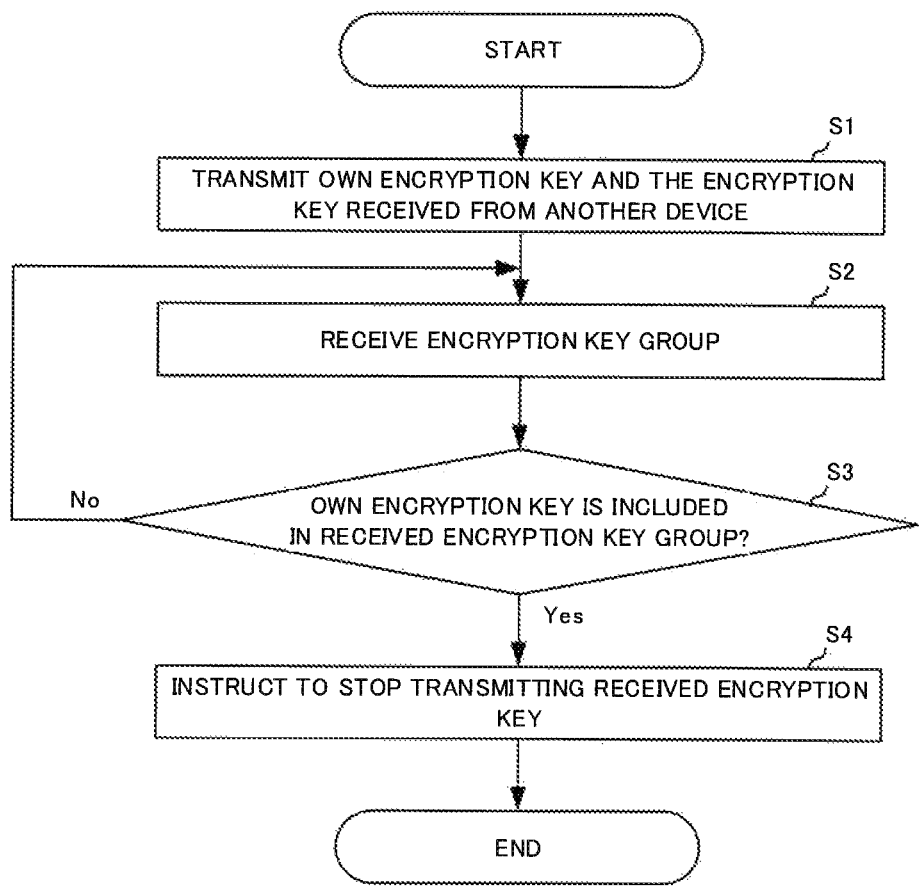
FIG. 4 is a flowchart for explaining a control method in the display device shown in FIG. 3.

Hereinafter, a control method in display device 100 is shown in FIG. 3. FIG. 4 is a flowchart for explaining a control method in display device 100 shown in FIG. 3

First, transmission unit 110 transmits the own encryption key which is the encryption key uniquely set for display device 100 and the encryption key transmitted from the other display device connected to display device 100 as the lower level device in the daisy-chain connection to the signal source and the other display device connected as the upper level device in the daisy-chain connection (Step S1). Then, display device 100 receives an encryption key group including a plurality of encryption keys from another display device connected as a lower level device (Step S2). Stop instruction unit 120 determines whether or not the own encryption key is included in the encryption key group including the plurality of encryption keys transmitted from the other display devices connected as the lower level device (Step S3). When the own encryption key is included in the encryption key group that includes a plurality of encryption keys transmitted from another display device connected as a lower level device, stop instruction unit 120 instructs another display device corresponding to the predetermined encryption key included in the encryption key group based on the order of the own encryption keys included in the encryption key group to stop transmitting the encryption key received by the display device (Step S4).

As described above, when the encryption key received from the other device includes the encryption key of the own machine, display device 100 instructs the display device that has transmitted the encryption key to stop transmitting the encryption key received by the display device. Therefore, display device 100 can display the image correctly.

Second Embodiment

Figure 5:
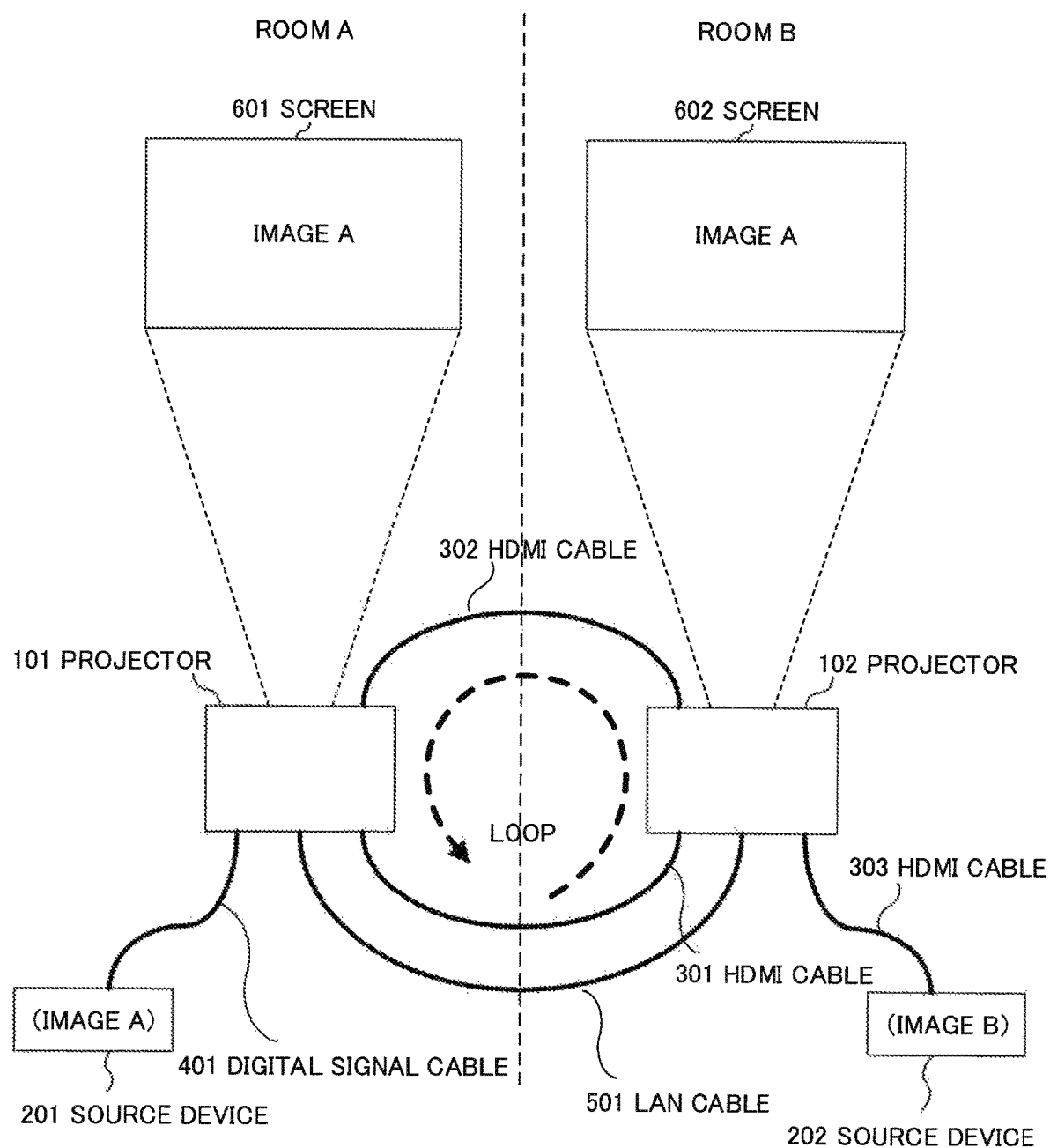
FIG. 5 is a diagram illustrating an example of a configuration of a video display system provided the display device of the present invention.

FIG. 5 is a diagram illustrating an example of a configuration of a video display system in which the display device of the present invention is provided. As shown in FIG. 5, source device 201 for outputting video A, projector 101 connected to source device 201 via digital signal cable 401, and screen 601 projecting an image by projector 101 are installed in room A. Here, digital signal cable 401, may be an interface (cable) for transmitting and receiving digital video signals such as DVI (Digital Visual Interface), HDMI (High-Definition Multimedia Interface)(registered trademark), DisplayPort, HDBaseT. Further, source device 202 for outputting video B, projector 102 connected to source device 202 via a digital signal cable such as HDMI cable 303, and screen 602 for projecting an image by projector 102 are installed in room B. Further, projector 101 and projector 102 are daisy-chained using a digital signal cable such as HDMI cable 301,302, loops are formed in this connection. Further, projector 101 and projector 102 are connected using wired LAN (Local Area Network) cable 501. Incidentally, LAN cable 501 may be RS (Recommended Standard) 232C cable, wireless LAN, DDC/CI (Display Data Channel Command Interface), such as using a function of CEC (Consumer Electronics Control).

By creating a connection in this manner and applying the present invention, a simple operation of each projector (for example, an operation of changing the video input terminal to which the video to be displayed is input), for example, projecting video A output by source device 201 in room A and room B, or projecting video B output by source device 202 in room A and room B can be performed.

Figure 6:
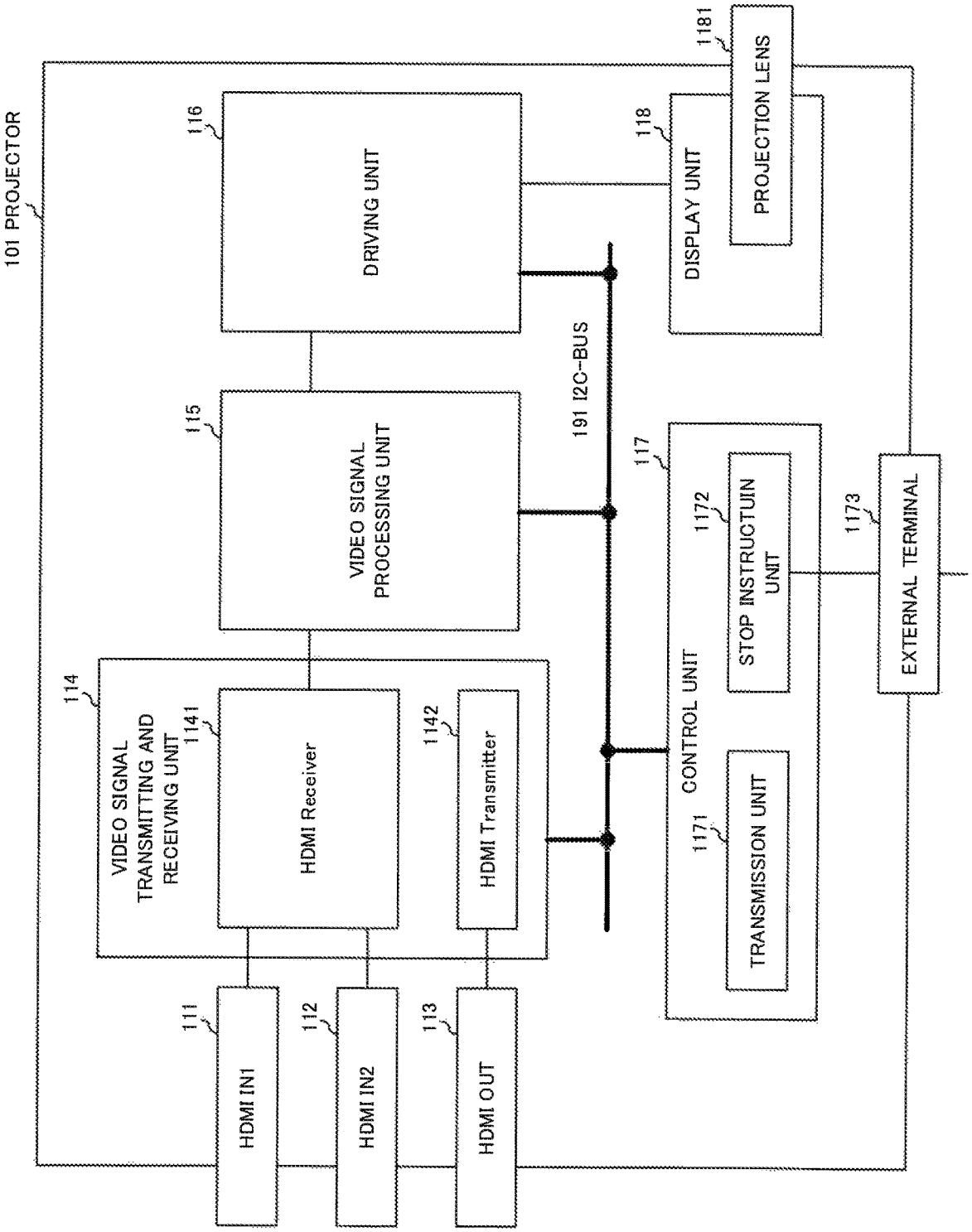
FIG. 6 is a diagram illustrating an example of an internal configuration of a projector is a display device shown in FIG. 5.

FIG. 6 is a diagram illustrating an example of the internal configuration of projector 101 that is the display device shown in FIG. 5. Projector 101 illustrated in FIG. 6 includes HDMI IN1 111, HDMI IN2 112, HDMI OUT 113, video signal transmitting and receiving unit 114, video signal processing unit 115, driving unit 116, control unit 117, and display unit 118, as shown in FIG. 6. Furthermore, video signal transmitting and receiving unit 114 includes HDMI Receiver 1141 and HDMI Transmitter 1142. Furthermore, display unit 118 has projection lens 1181. FIG. 6 shows one example of the main components of projector 101, which is the display device shown in FIG. 5, according to this embodiment. Incidentally, projector 102 which is a display device is assumed to have the same components as projector 101.

HDMI IN1 111 is a terminal connected via a cable to source device 201, a signal source (the upper level device) shown in FIG. 5. That is, with respect to HDMI IN1 111, the source device 201 becomes the upper level device of projector 101. HDMI IN2 112 is a terminal connected to HDMI OUT terminal of projector 102 shown in FIG. 5. That is, with respect to HDMI IN2 112, projector 102 becomes the upper level device of the projector 101. HDMI OUT 113 is a terminal connected to HDMI IN2 terminal of the projector 102 shown in FIG. 5. That is, with respect to HDMI OUT 113, projector 102 becomes a lower level device of projector 101. Incidentally, these terminals are not HDMI, may be for transmitting and receiving digital video signals such as DVI or DisplayPort, HDBaseT. External terminal 1173 is terminal LAN cable 501 shown in FIG. 5 is connected. Further, external terminal 1173, although the LAN cable 501 is connected, can not only be used for wired communication, it may also be a communication module for performing wireless communication.

The video signal transmitting and receiving unit 114 receives the video signal and the control signal through the terminals of HDMI IN1 111 and HDMI IN2 112, and transmits the received video signal and the control signal through the terminals of HDMI OUT 113. HDMI Receiver 1141 of the video signal transmitting and receiving unit 114 performs serial-to-parallel conversion of the received video signal, signal-level conversion, decoding of the timing signal included in the control signal, and the like. Further, HDMI Receiver 1141 outputs the received video signal and the control signal to HDMI Transmitter 1142 of video signal transmitting and receiving unit 114. HDMI Transmitter 1142 transmits signals input from HDMI Receiver 1141 to projector 102 via a HDMI OUT 113.

Video signal processing unit 115 performs predetermined processing for performing projection on the signal received by the video signal transmitting and receiving unit 114 and subjected to predetermined processing. Specifically, video signal processing unit 115 performs various types of video correction, such as gamma correction and distortion correction, for example, and outputs the correction to driving unit 116.

Driving unit 116 drives a display element and a light source of display unit 118 and the like and outputs the video signal processed by video signal processing unit 115 by emitting image light using projection lens 1181 of display unit 118. Display unit 118 projects an image using projection lens 1181 based on the video signal output from the signal source. The projected image is displayed on screen A 601.

Control unit 117 controls entire projector 101 using a I2C-BUS191 control bus (which may be another processor bus). Control unit 117 includes transmission unit 1171, and stop instruction unit 1172. Transmission unit 1171 transmits the own encryption key, which is the encryption key uniquely set for projector 101, and the encryption key, which is transmitted from projector 102, which is another display device connected to projector 101 as a lower level device in the daisy chain connection, to source device 201, which is the signal source, and projector 102, which is connected as a lower level device in the daisy chain connection. When transmission unit 1171 receives an instruction from projector 102 to stop the transmission of the encryption key received by projector 101, it stops the transmission of the encryption key received by projector 101. When the own encryption key is included in the encryption key group including a plurality of encryption keys transmitted from projector 102 connected as a lower level device, stop instruction unit 120 instructs projector 102, which is another display device corresponding to the predetermined encryption key included in the encryption key group based on the order of the own encryption keys included in the cryptographic key group, to stop transmitting the encryption key received by projector 102 through external terminal 1173. When the encryption key group including the plurality of encryption keys transmitted from projector 102 includes the own encryption key, stop instruction unit 120 instructs projector 102, which is another display device corresponding to the predetermined encryption key included in the encryption key group, to change the voltage level of the supply power from high to low on the basis of the order of the own encryption keys included in the encryption key group.

In the following description, the encryption key is described using an example in which it is a KSV (Key Selection Vector), but it may be the device-specific information, for example, a serial number or uniquely assigned identification information (ID: Identification). This KSV is a encryption key that is used in HDCP (High-bandwidth Digital Content Protection) of copyright protection techniques that are used in the communication of digital video signals such as HDMI, DPs (Display Port), DVIs, etc.

HDCP is one of the encryption protocols for video transmission. KSV is an encryption key used for encryption and decryption, and it is also called a public key. KSVs are unique keys assigned to each device corresponding to HDCP.

In HDCP, a display device (hereinafter, referred to as sink device) or a relay device (hereinafter, referred to as repeater (Repeater) device) receives certification of a signal source (hereinafter, referred to as source (Source) device) such as a PC or a Blu-ray Disk device. If the KSV is not transmitted normally, the video signal will not be decrypted and no video will be displayed. When the sink device and the source device are connected, the sink device sends its own certificate or KSV to the source device. KSV is used to determine the key used for encryption. Therefore, the KSV transmitted from the sink device is transmitted to the source device without being modified by other sink devices or the like.

For example, when a plurality of sink devices are daisy-chained, the KSV transmitted from the sink device disposed at the end (lowest) of the daisy-chain connection, regardless of the sink device that has been routed, is transmitted to the source device while still in the state (information) transmitted from the sink device disposed at the end (lowest). In addition, the KSV of the sink device itself is also transmitted to the source device. At that time, each sink device stores the KSV transmitted from the lower sink device in its own memory, and transmits (transfers) to the upper sink device or the source device. When the connection with the lower sink device is disconnected, the KSV of the corresponding sink device is erased from the memory. Incidentally, when in a daisy-chain connected state, the sink device disposed between the sink device of the terminal (lowest) and the source device also functions as a repeater device. Incidentally, for example, the function of transmitting the KSV received from the lower level device to the upper device, the function of transmitting the KSV other than itself to the upper level device, the function of receiving the KSV from the lower level device, or, the function of transmitting its own KSV to the upper level device by adding the KSV received from the lower level device are the repeater functions.

Sink device connected to the source device can determine that it itself is connected to the source device using the transmission and reception of information. In addition, the sink device (repeater device) makes its own KSV the first, and sends the KSV received from the lower device to the upper device by adding the second or later. In addition, each time the sink device receives KSV from a lower level device, it adds KSV received from the lower level device to the own KSV and transmits it to the upper level device. That is, the KSV to be transmitted to the upper level device is transmitted in the order of its own KSV, and then the KSV of the lower level device. If three or more devices are connected, the KSV of its own, then, KSV of the lower level device directly connected, then, KSV of the lower level device directly connected to the lower level device directly connected (hereinafter, according to the order connected) the order. That is, the uppermost sink device (sink device directly connected to the source device (display device)) can recognize, when receiving the information (information including a plurality of KSV) of the KSV group including its own KSV, in the order of KSV (row), the sink device having one before KSV of its own KSV is the sink device (display device) disposed at the terminal (lowest). The order of KSV when transmitting may be determined in advance—it is not limited to the order described above.

In the present invention, when the daisy chain connection of a plurality of sink devices is looped, each sink device has an input such as at least two systems, and grasps the KSV of the sink device, the sink device itself KSV is transmitted to utilize that come. If its own KSV is present in the KSV group received from the lower sink device, as described above, a sink device notifies the sink device having the previous KSV with respect to the order of its own KSV to stop the repeater function. The notified sink then device stops the repeater function and the sink device that has stopped the repeater function operates itself as the lowest (terminal) sink device. As a result, a normal image display is performed.

Figure 7:
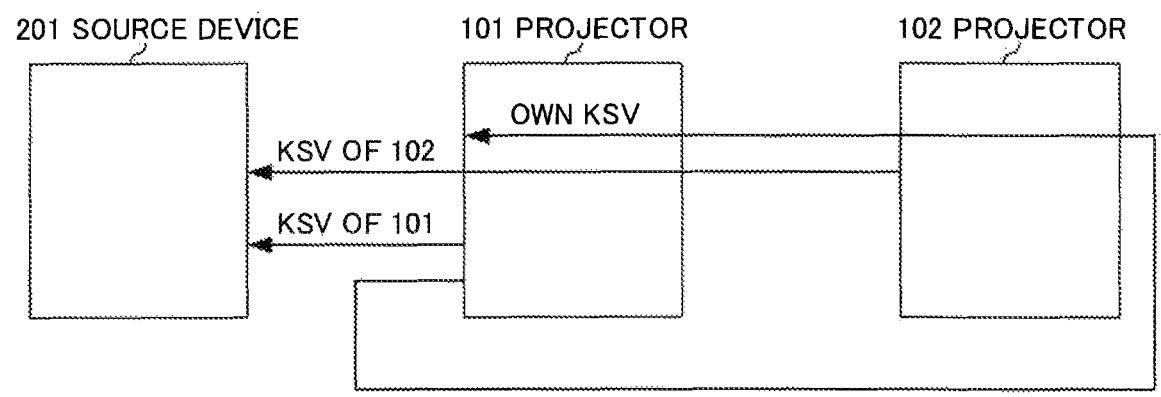
FIG. 7 is a diagram illustrating an example of the flow of KSV when the daisy chain connection is looped.

FIG. 7 is a diagram illustrating an example of the flow of KSV when the daisy chain connection is looped. As shown in FIG. 7, projector 101 transmits its own KSV (own encryption key) to source device 201, which is the upper level device, and to projector 102, which is connected to the upper order with respect to the daisy chain. Projector 102 transmits its own KSV to projector 101 which is connected in an upper order with respect to the daisy chain. Projector 102 also transmits the KSV of projector 101 received from projector 101 connected to the lower order with respect to the daisy chain to projector 101 connected to the upper order with respect to the daisy chain in addition to its own KSV. Projector 101 transmits the KSV of projector 101 and the KSV of projector 102 received from projector 102 connected to the lower order with respect to the daisy chain to source device 201 and projector 101 connected to the upper order in the daisy chain in addition to its own KSV. Projector 102 that received the KSV transmits the KSV of projector 101 received from projector 101 connected to the lower order with respect to the daisy chain and the KSV of projector 102 to projector 101 connected to the upper order with respect to the daisy chain in addition to its own KSV. At this time, projector 101 and projector 102 operate as repeater devices. When operating as a repeater device, the device transmits (transfers) the transmitted (received) KSV to the upper level device (source device or the upper level device of the daisy-chain connection). That is, transmission and reception of the KSV is continued between projector 101 and projector 102 connected in a loop using a daisy chain, a state in which the processing is not completed. In other words, in a daisy-chain connection, the terminal sink device is not determined. In other words, the image is not displayed.

As described above, KSV is the more sink devices to be routed, the more KSV to be transmitted to the source device. Normally, if another device (lower level device) is connected to HDMI OUT, the KSV of the lower level device is received and the received KSV is transmitted to the source device together with its own KSV. However, if the connections between the projectors are loop connected as shown in FIG. 5, the KSV will continue to be transmitted, and the image will not be displayed normally. In practice, as shown in FIG. 7, the KSV of projector 101 itself will be transmitted. Therefore, when its own KSV is transmitted, projector 101 controls the lower order devices through the control cable that connects projector 101 and projector 102 to stop the repeater function. This stops the transmission of KSV, and the video is output.

Figure 8:
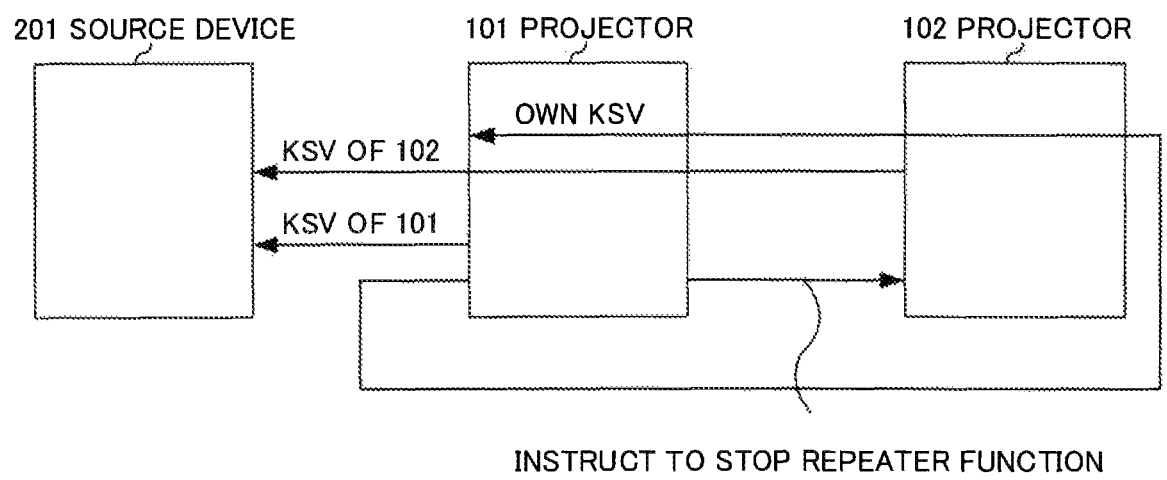
FIG. 8 is a diagram illustrating an example in which the projector instructs another projector to stop the repeater function.

FIG. 8 is a diagram illustrating an example in which projector 101 instructs projector 102 to stop the repeater function. When projector 102 transfers the KSV of projector 101 using the repeater function as shown in FIG. 7, projector 101 instructs projector 102 to stop the repeater function as shown in FIG. 8. This instruction uses external terminal 1173 shown in FIG. 6 and the LAN cable 501 shown in FIG. 5. Thus, projector 102 stops the repeater function of transferring the received KSV (of projector 101) to projector 101. Projector 102 that stopped the repeater function operates as a sink device, not as a repeater device.

Figure 9:
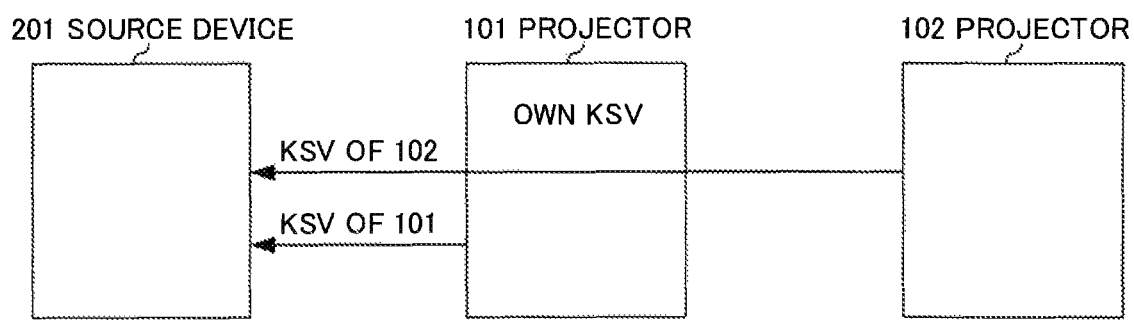
FIG. 9 is a diagram illustrating an example in which the projector stops the repeater function.

FIG. 9 is a diagram illustrating an example in which projector 102 stops the repeater function. When projector 101 instructs projector 102 to stop the repeater function as shown in FIG. 8, projector 102 stops transmitting the KSV of projector 101 as shown in FIG. 9. This prevents projector 101 from receiving the KSV of projector 101 from projector 102.

Figure 10:
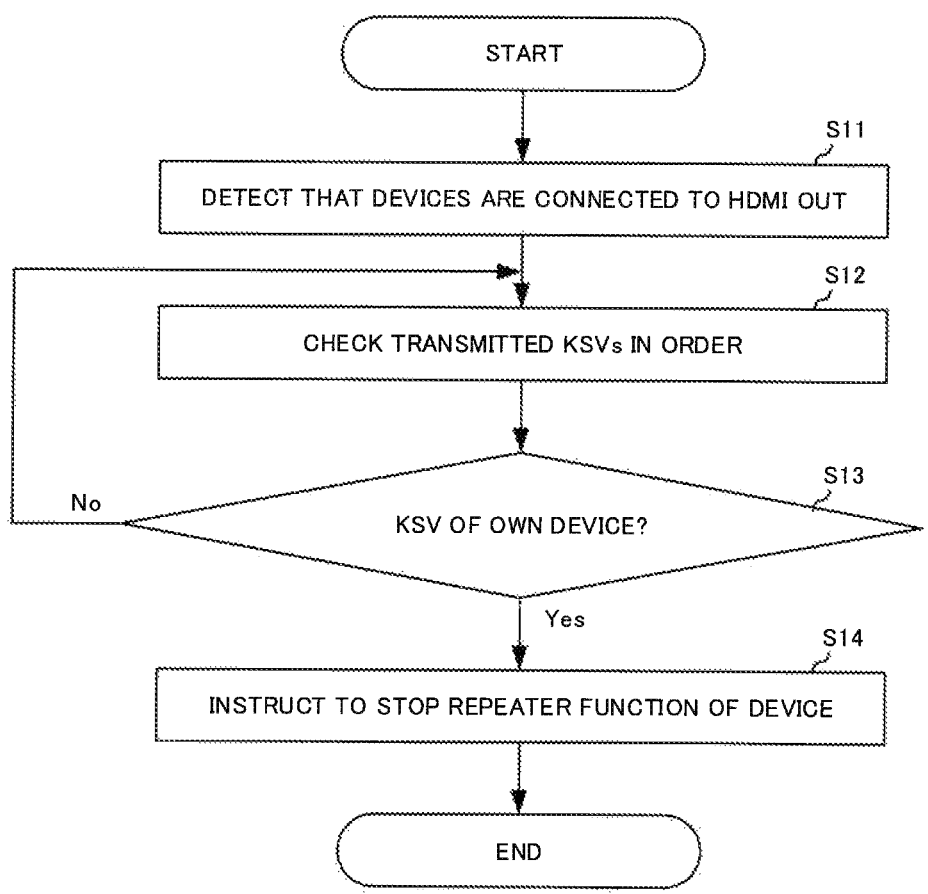
FIG. 10 is a flowchart for explaining a control method in the projector shown in FIG. 5.

Hereinafter, a control method in projector 101 illustrated in FIG. 5 will be described. FIG. 10 is a flowchart to explain a control method in projector 101 shown in FIG. 5.

Control unit 117 confirms that other devices (lower level device) are connected to HDMI OUT 113 (step S11). To check whether or not other devices are connected to HDMI OUT 113, for example, it is possible to use a hot-plug (Hotplug) signal HDMI terminal has. If the hot-plug signal indicates a High level, it can be determined that another device is connected. If the hot plug signal indicates a Low level, it can be determined that no other device is connected. Incidentally, the hot plug signal, is generated using a power supply (hot plug power supply) supplied from the upper level device via a digital signal cable (HDMI cable or the like) by the lower level device, and is output to the upper level device. The power supplied from the upper level device is not necessarily a power source for generating a hot plug signal, but in the present invention, for convenience, is a hot plug power source. Subsequently, control unit 117 checks the KSVs that are transmitted to HDMI OUT 113 in sequence (step S12). Stop instruction unit 1172 compares the KSV of the transmitted KSV and its own device, and it is determined whether or not the transmitted KSV is the KSV of its own device (step S13). If the transmitted KSV is not the KSV of the own device, stop instruction unit 1172 determines whether or not the KSV that has been subsequently transmitted is the KSV of its own device. If the transmitted KSV is the KSV of its own device, stop instruction unit 1172 controls the lower level device (in this case, projector 102) via LAN cable 501, and transmits an instruction to stop the repeater function of projector 102 (step S14). This instruction to stop repeater function specifically instructs that the voltage level of the hot-plug power supply outputting from HDMI OUT terminal of projector 102 be changed from high to Low, i.e., not to supply hot-plug power. That is, by stopping the supply of power from projector 102, it is possible to stop the output of the hot plug signal of projector 101, and projector 102 operates as a terminal device. Therefore, control unit 117 may instruct that the voltage level of the hot-plug power supply be changed from High to Low, for example, using a change or the like of the control and connection of the connected resistor elements. In this way, the sequence of connecting HDMI is stopped, and projector 102 becomes the last stage (end) sink device that does not output HDMI. Then, transmission of the KSV from the projector 102 stops, and an image is output.

Incidentally, so as to stop the repeater function of projector 102, stop instruction unit 1172 of projector 101 was to transmit an instruction to the lower level device (projector 102) via LAN cable 501, but not limited thereto. For example, in step S13, if the transmitted KSV is the KSV of its own device, control unit 117 (stop instruction unit 1172), may change the signal level of the hot plug signal of HDMI IN2 112 of its own device from High to Low (not supplying a voltage as a hot plug signal to other devices arranged in the upper). That is, the output of the hot plug signal of projector 101 can be stopped, and projector 102 operates as a terminal device. In this way, the sequence of connecting HDMI is stopped, and projector 102 becomes the last stage (end) sink device that does not output HDMI. In this case, external terminal 1173 is not necessary and it is not necessary to control the lower level device (in this case, projector 102) via LAN cable 501.

Thus, if a daisy-chain connection between projector 101 and the other projector 102 loops, projector 101 determines whether or not the encryption key of its own device is included in the encryption keys transmitted from projector 102. If the encryption key transmitted from projector 102 includes the encryption key of its own device, projector 101 instructs projector 102 to stop the transfer of the encryption key received by projector 102. Therefore, it is possible to prevent the transfer of the encryption key of its own device repeatedly, the encryption of the image using the encryption key is decrypted, and normal image display can be performed.

The present embodiment includes a description with reference to a projector, it is not limited thereto. For example, a display device such as a display can be used in place of the projector. The present invention can also be applied to a display system formed by combining different types of display devices.

Although described above by sharing each function (processing) to each component, the embodiment is not limited to those described above. In addition, the configuration of the constituent elements is merely an example, and is not limited thereto. Further, it may be a combination of each embodiment.

Processing performed by each component described above may be performed in each logic circuit fabricated according to the purpose. In addition, a computer program (hereinafter, referred to as a program) describing the processing content as a procedure may be recorded on a recording medium that can be read by a device (hereinafter, referred to as an information processing device) including each component, and the program recorded on the recording medium may be read into the information processing device and executed. Recording media that can be read by information processing equipment include portable recording media such as floppy (registered trademark) disks, magneto-optical disks, DVDs (Digital Versatile Disc), CD (Compact Disc), Blu-ray (registered trademark) Disc, and USB (Universal Serial Bus) memory, as well as memory such as ROM (Read Only Memory), RAM (Random Access Memory), and HDD (Hard Disc Drive) built into information processing equipment. The program recorded on the recording medium is read by the CPU provided in the information processing apparatus, and the same processing as described above is performed by the CPU. Here, the CPU operates as a computer that executes a program read from a recording medium on which the program has been recorded.

The invention claimed is:

1. A display device, that is connected to a signal source for outputting a video signal using an encryption protocol, and that transmits an encryption key used in the encryption protocol to the signal source, comprising:

a transmission unit that transmits own encryption key which comprises an encryption key uniquely set for the display device and an encryption key transmitted from another display device connected to the display device as a lower level device in the daisy chain connection to another display device connected as an upper level device in the daisy chain connection; and a stop instruction unit that instructs another display device, corresponding to a predetermined encryption key included in an encryption key group based on the order of the own encryption keys included in the encryption key group, to stop transmitting the encryption key received by the another display device when the own encryption key is included in the encryption key group including a plurality of encryption keys transmitted from another display device connected as the lower level device.

2. The display device according to claim 1, wherein the stop instruction unit instructs the display device that has transmitted the encryption key to change the voltage level of the hot-plug (Hotplug) power supply from High to Low when the encryption key transmitted from the another display device includes the own encryption key.

3. The display device according to claim 1, wherein when receiving an instruction from the another display device to stop transmitting the encryption key received by the display device, the transmission unit stops transmitting the encryption key received by the display device.

4. The display device according to claim 1, wherein the encryption key comprises a KSV (Key Selection Vector).

5. The display device according to claim 1, the display device comprising:
a display unit that displays an image based on the video signal output from the signal source.

6. A control method, comprising:
transmitting an own encryption key which comprises an encryption key uniquely set for a display device that is connected to a signal source for outputting a video signal using an encryption protocol and transmits the encryption key used in the encryption protocol to the signal source, and an encryption key transmitted from another display device connected to the display device as a lower level device in the daisy chain connection to another display device connected as an upper level device in the daisy chain connection; and instructing another display device corresponding to a predetermined encryption key included in an encryption key group based on the order of the own encryption keys included in the encryption key group to stop transmitting the encryption key received by the another display device when the own encryption key is included in the encryption key group including a plurality of encryption keys transmitted from another display device connected as the lower level device.

7. A computer-readable storage device storing a program that makes a display device which is connected to a signal source for outputting a video signal using an encryption protocol, and transmits an encryption key used in the encryption protocol to the signal source, execute:

processing of transmitting an own encryption key which comprises an encryption key uniquely set for the display device and an encryption key transmitted from another display device connected to the display device as a lower level device in the daisy chain connection to another display device connected as an upper level device in the daisy chain connection; and processing of instructing another display device corresponding to a predetermined encryption key included in an encryption key group based on the order of the own encryption keys included in the encryption key group to stop transmitting the encryption key received by the another display device when the own encryption key is included in the encryption key group including a plurality of encryption keys transmitted from another display device connected as the lower level device.

\* \* \* \* \*